United States Patent [19]

Janis et al.

[11] Patent Number: 5,247,681

[45] Date of Patent: Sep. 21, 1993

[54] DYNAMIC LINK LIBRARIES SYSTEM AND METHOD

[75] Inventors: Frederick L. Janis, Keller, Tex.; Jeffery D. Aman, Wappingers Falls, N.Y.; Daryl R. Cox, Bedford, Tex.

[73] Assignee: International Business Machines Corporation, Armonk, N.Y.

[21] Appl. No.: 629,703

[22] Filed: Dec. 18, 1990

[51] Int. Cl.⁵ .................... G06F 12/08; G06F 9/40

[52] U.S. Cl. .................... 395/700; 364/DIG. 1; 364/243.2; 364/243.42

[58] Field of Search .................... 395/700

[56] References Cited

U.S. PATENT DOCUMENTS 4,742,450 5/1988 Duvall et al. .................... 364/200

Primary Examiner—Gareth O. Shaw
Assistant Examiner—A. Katbab
Attorney, Agent, or Firm—Sterne, Kessler, Goldstein & Fox

1 Claim, 4 Drawing Sheets

DYNAMIC LINK LIBRARIES SYSTEM AND METHOD

BACKGROUND OF THE INVENTION

1. Field of the Invention

This invention relates to a system and method for the management of memory within a computer. More specifically, the present invention relates to a system and method for dynamically allocating modules of a computer program at run-time, and allowing instances of that computer program to share modules loaded into a private user area.

2. Related Art

Theories and implementations of memory management techniques have played a key role in helping computers progress to their present state of technology. Since computers have a finite amount of memory capacity, the way in which a computer's memory is managed is essential for its efficient operation. This is especially true for computers that allow for multi-user and/or multi-tasking environments, since memory requirements in such environments can be very large.

Very frequently, a computer program is designed so that it consists of a number of separate software modules. These separate software modules are often stored together in what is called a library. When such a computer program is executed, only some of those software modules may be needed from the library. Precisely which modules will be needed may depend upon a number of factors, including interactively-made user decisions, the type of computer or operating system being used, etc.

At present, memory management schemes exist where the software modules are dynamically selected from the library during the actual execution (or "run-time") of the computer program. In this type of scheme, the library is often referred to as a "run-time" or "dynamic link" library. In a preferred embodiment, the modules of the library comprise re-entrant code.

During the operation of such a scheme using a dynamic link library, a front-end or "initialization module" is typically loaded into the main memory of the computer which is executing the computer program. As the program executes, additional software modules may be required. Any additional modules are loaded into main memory when needed from the dynamic link library. In this way, only those modules which are required are loaded into main memory. Otherwise, the entire computer program would have to be loaded into main memory at the beginning of execution. Thus, the use of schemes using dynamic link libraries allow the main memory of computers to be more efficiently utilized.

On typical multi-user machines, any number of computer programs can be made available to a given user. However, it is often the case that more than one user will want to execute the same computer program at the same time or, for that matter, the same user may request that the same computer program be executed multiple times concurrently. In multi process/multi-user environments, when such requests to execute a computer program are made, each request is said to generate another process or "instance" of that computer program. An instance generally represents the existence of another logical copy of the computer program which is ready to execute. In a sense, it represents a "desire" to execute a particular computer program, along with some specific parameters and data.

In conventional computer architecture, each instance is put on some kind of queue and has to wait its turn to make use of the facilities of the computer. (Such facilities include the computer's memory, central processing unit, etc.). When an instance takes its turn to access the facilities, the instance will have more-or-less full control, but only for a limited duration of time. This concept is generally known as "time-sharing," and is a scheme used in most multi-user environments. Whether the instance is stored somewhere in main memory or on some storage device such as a disk drive is usually a decision made by the operating system of the computer.

FIG. 1 shows a conventional memory management scheme which takes advantage of some of the concepts noted above. Referring to FIG. 1, main memory 102 is divided into a private area 104 and a common area 106. The private area 104 represents an address area of main memory 102 which is allocated to the specific computer programs and data used by the users. Thus, when a user executes a computer program, it is generally loaded into these private address areas.

While the private area 104 may be available to the current instance (that is, the instance presently in control), the actual computer programs or modules that may be stored there from previous instances are not. With conventional technology, to do otherwise could potentially cause a break-down in integrity and/or security. Also, in keeping with the general philosophy that a given instance is granted what it at least perceives as full use of the facilities of the computer, to do otherwise would run counter to this philosophy.

Since the private area 104 does not permit instances to gain access to the previous work of other instances, the memory management scheme shown in FIG. 1 also contemplates the existence of a common area 106 of main memory 102. This common area 106 is generally accessible to the current instance, and computer programs which are frequently used are loaded into this area. In this way, if many instances simultaneously request a particular computer program, they can all access and share the computer program in the common area 106 without each instance having to load the computer program into private area 104. The basis of this scheme is that a user's own personal computer programs and data cannot be written to the common area. This means that anything stored in common area 106 is not directly affected each time another instance takes control of the computer (that is, not directly affected by the impact of time-sharing).

In addition, the common area scheme shown in FIG. 1 also contemplates that a computer program can be loaded into the common area 106 as a dynamic link library. In this way, each time a user executes such a computer program, only those modules needed will be loaded into the common area 106. Once loaded, the computer program then branches to the appropriate address in the common area 106 to access the loaded software module.

The scheme of FIG. 1 further contemplates that the computer can keep track of exactly which software modules have been loaded into the computer by previous instances, and what the addresses of those software modules are. Thus, where the current instance requests a module that is already loaded, it can branch to the address of the appropriate software module in the common area 106 without having to re-load the software module. The ability to continuously store the addresses of these software modules is enhanced by the fact that the addresses themselves can be kept in the common area 106, which is not directly affected by the impact of time-sharing.

Although perhaps an improvement from previous techniques, the memory management scheme described above with regard to FIG. 1 still suffers from some disadvantages. For example, the common area 106 in such a scheme is usually a scarce resource in which only a limited amount of storage is available. In addition, in many large multi-user environments, the systems programmer must consent to allowing any computer program to b made accessible from the common area 106. This adds an extra step in the process, and one which the systems programmer may not want to take, especially if he or she feels that not enough people are going to utilize the computer program to make it worthwhile.

What is thus needed is a scheme to allow sharing of previously loaded software modules without having to place them in common areas.

SUMMARY OF THE INVENTION

The present invention overcomes the deficiencies of the previous techniques by providing a system and method for sharing previously loaded software modules which are part of a computer program without having to place them in a common area of main memory of a computer system. More specifically, the present invention keeps track of the location of any software modules which remain loaded in a private area of main memory, having been loaded by a previous execution of the computer program. In this way, a subsequent execution of that computer program requiring those software modules can immediately access them rather than having to re-load them into memory.

The addresses for the software modules which have been loaded into main memory are kept in a memory location which is not directly affected by the impact of time-sharing. The software modules themselves are loaded into the private area of memory, and are in effect stored in that area for possible later use by a subsequent execution of the same computer program.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which.

DETAILED DESCRIPTION OF THE PREFERRED EMBODIMENTS

The present invention relates to a system and method for the management of memory within a computer. More specifically, the present invention relates to a system and method for dynamically allocating modules of a computer program at run-time, and allowing instances of that computer program to access software modules previously loaded into a private user area.

Figure 1:
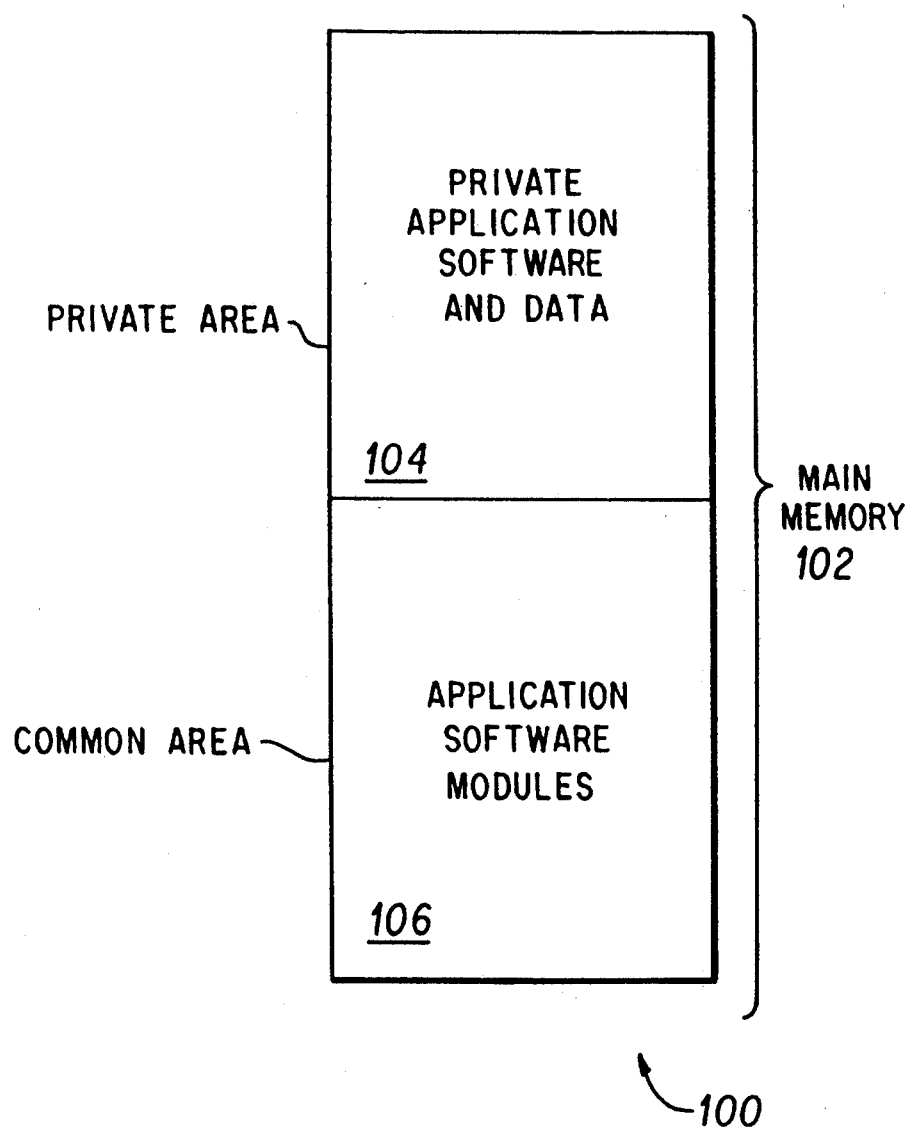
FIG. 1 shows a conventional memory management scheme.
Figure 2:
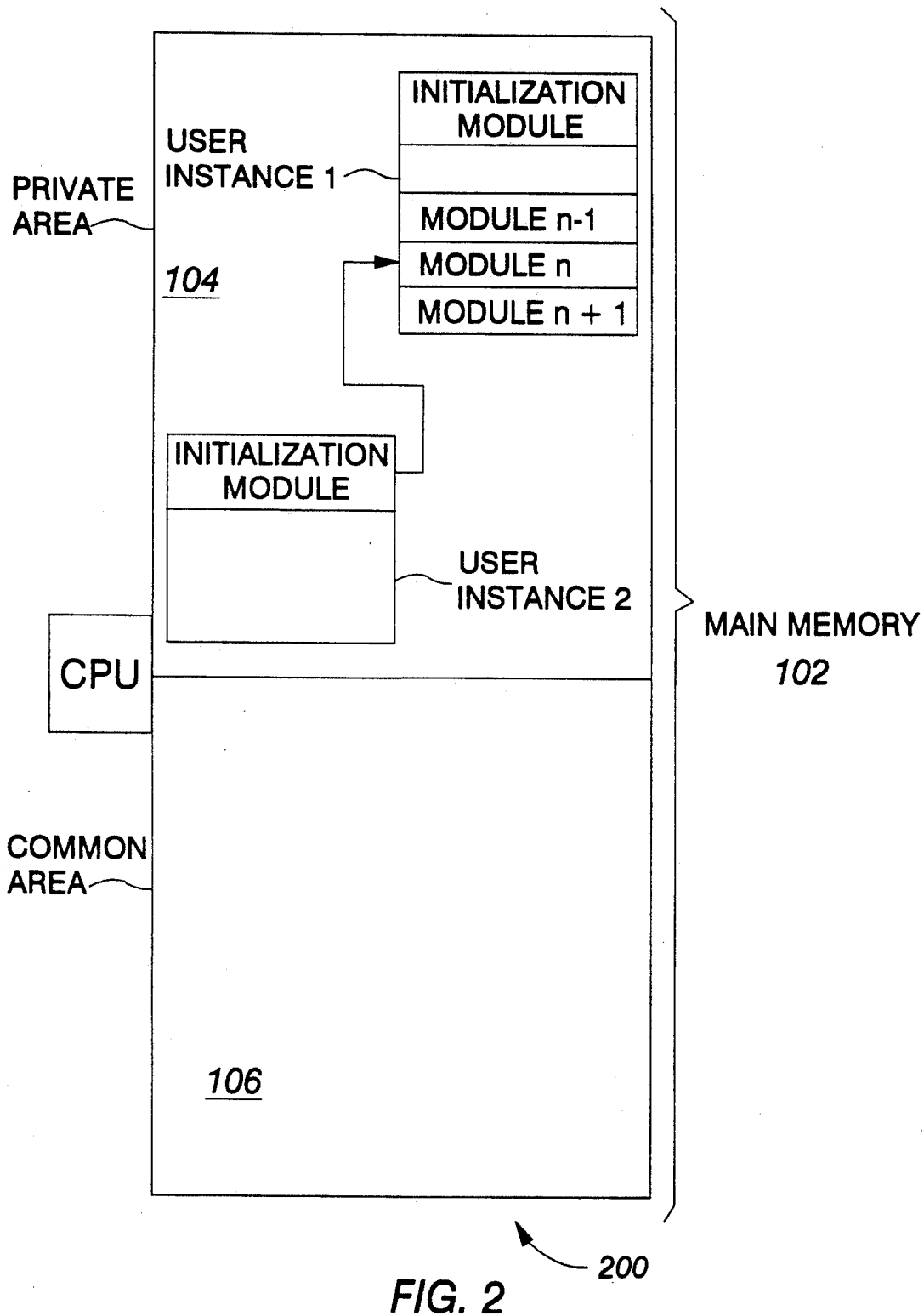
FIG. 2 is a high-level diagram of the present invention.

An overview of the present invention can best be described with reference to FIG. 2. This figure illustrates the basic sequence of events which are part of the present invention As shown by FIG. 2, a first instance of a computer program is executed (as indicated by User Instance 1), and an initialization module is loaded into the private area 104 of main memory 102. As this instance is executed, additional software modules for this instance are dynamically allocated as needed. By way of example, the n+1 software modules shown in FIG. 2 represent those software modules which were needed by User Instance 1 which were consequently loaded into private area 104.

Assume now that a second user requests execution of the same computer program. This will create another instance (designated as User Instance 2) which, when it becomes the current instance, will load another initialization module into private area 104. If during the execution of user instance 2 module n of the computer program is needed, then if this module is not yet loaded, it will be loaded into private area 104. This newly loaded software module will then be branched to, and the computer program will continue executing.

However, if module n has already been loaded by a previous instance, then User Instance 2 will obtain the address of this module, and will branch to it rather than re-load it. In the example shown by FIG. 2, module n has already been loaded by user instance 1, so that module n can be branched to without having to be re-loaded.

In implementing the present invention, when User Instance 2 becomes the current instance, it must be effected that the software modules which were previously loaded and may be needed by the current instance are not over-written. It is contemplated that this is taken care of by the operating system when it stores an instance between the times when the instance has control of the computer. In addition, it is also contemplated that the addresses of these modules are kept in some location of memory so that they too will not be over-written.

In general, it can be seen that the present invention allows for software modules to be loaded into the private area 104 of memory 102 by one instance wherein these software modules are subsequently accessible to other instances without having to load the software modules into the valuable space of common area 106. In effect, each software module need only be loaded into the private area 104 once. Moreover, this scheme does not need to make use of common area 106, nor does it result in corrupting the integrity or compromising the security of the software modules within the private area 104.

Although the above description (as well as that which follows) implies that there are two users involved, it should be understood that the present invention also contemplates more than two users, as well as a single user executing two instances of a computer program in parallel. Thus, the description of two users is merely for purposes of example.

Figure 3:
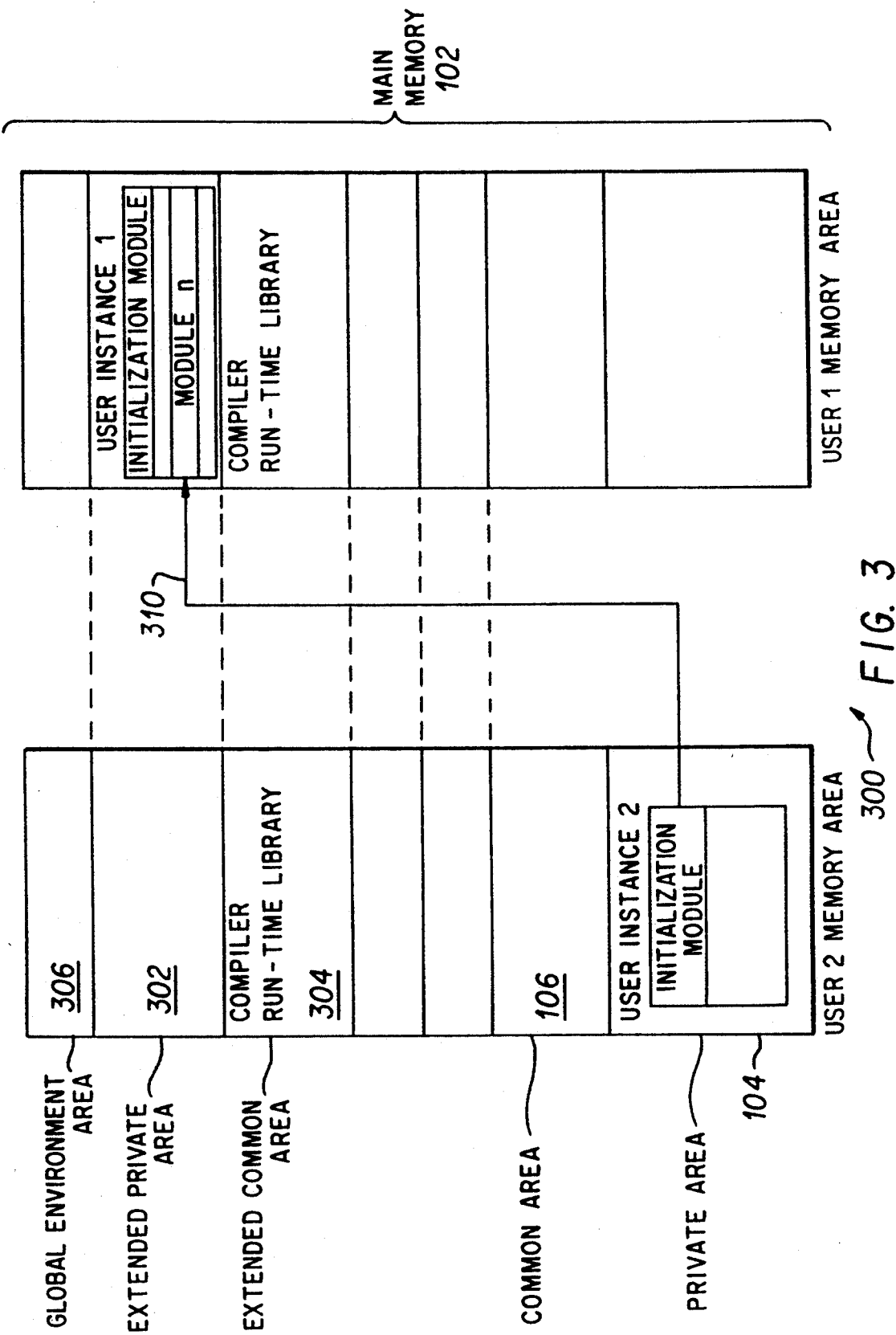
FIG. 3 is a low-level diagram of the present invention.

FIG. 3 shows a preferred embodiment of the present invention contemplating the use of the MVS operating system (available from International Business Machines, Armonk N.Y.) employing cross memory and extended memory. (For more information on this operating system, see chapters 1-3 of IBM publication GC21-1854, entitled "MVS/ESA SPL: Application Development—Extended Addressability.") Because this environment is a multi-user/multi-processing environment as described above, User 1 Memory Area as shown in FIG. 3 indicates how User Instance 1 views main memory 102 while it is in control of the computer (that is, while it is the current instance). Similarly, User 2 Memory Area shows how User Instance 2 views main memory 102 while it has control. It should be understood that while the MVS operating system is mentioned as part of a preferred embodiment, that the present invention can also be used in a multitude of other multi-user/multi-processing environments employing cross memory or the like.

As shown in FIG. 3, main memory 102 is further sub-divided to include an extended private area 302 and extended common area 304. These areas function in the same way as private area 104 and common area 106, and merely serve as extended address areas for computer programs and data which are able to take advantage of this extended amount of memory. It should be understood that these extended areas are not critical to the functioning and purpose of the present invention.

The structure and operation of a preferred embodiment of the present invention will now be explained with regard to FIG. 3. When a first user executes a computer program, User Instance 1 is generated (and is the current instance), and an initialization module is loaded into memory. FIG. 3 shows this to have occurred in extended private area 302, but this is just by way of example, and could also have occurred in private area 104. In any event, the present invention contemplates that a pool of address spaces be kept available for the creation of new instances, and for the additional memory needs of existing ones.

When User Instance 1 has been generated and is in control of the computer, User 1 Memory Area as shown in FIG. 3 is how this instance perceives main memory 102. As the computer program of User Instance 1 executes, other software modules that are needed to continue execution are loaded into main memory 102. As indicated in the example of FIG. 3, module n is representative of one such software module.

As User Instance 1 loads software modules into main memory 102, the addresses of the software modules for each instance of a computer program are generated and stored within a global environment area 306. In a preferred embodiment shown in FIG. 3, this global environment area 306 is part of main memory 102, although it should be understood that this does not have to be the case. As the name implies, any information which is stored in the global environment area 306 does not change as control of the computer is handed over from one instance to the next. In this way, when the address of a software module is put into the global environment area 306, a subsequent instance which takes control from the prior instance will be able to access that address that was put into the global environment area 306.

When the time allotted to User Instance 1 has expired, the next instance in line on the queue takes control, as indicated here by User Instance 2. As indicated above, the operating system will store the previous current instance (in this case, User Instance 1) either on a storage device such as a disk drive, or else keep it in main memory 102. If that portion of main memory is subsequently needed by the computer for the current instance, then the stored instance will be moved to an alternate storage device until it is again its turn to control the computer. In any event, any movement of the instance or portions thereof will update the global environment area 306.

In the example shown by FIG. 3, User Instance 2 is an instance of the same computer program as User Instance 1. Also in this example, it is shown that the initialization module for User Instance 2 was loaded into private area 104. It should be understood, however, that User Instance 2 could just as easily have been generated in some other private area of memory such as extended private area 302.

During the duration of time that User Instance 2 has control of the computer, User 2 Memory Area is how it views the memory available to it. Software modules may still be resident in main memory 102, but these are transparent to User Instance 2.

When User Instance 2 is the current instance and requires another module for its execution, it first checks to see if it has already loaded the required software module itself. If it has not, it checks the global environment area 306 to assess whether another instance of the computer program has previously loaded the required module into memory. If this is the case, it gets the address of the software module from the global environment area 306, branches to the address of the needed module, and begins to execute the required module. As shown by FIG. 3, User Instance 2 was in need of module n. It consequently branched to the address where User Instance 1 had loaded it, as shown by arrow 310.

Since the computer program being executed may have been written using a compiler requiring that certain compiler run-time modules be constantly loaded somewhere in main memory 102, FIG. 3 further shows that a compiler run-time library has been placed in the extended common area 304. However, it should be noted that depending upon the compiler or the way that the computer program has been created, such a compiler run-time library may not be necessary. This is pointed out in FIG. 3 merely to show that the use of common areas to load computer programs can also be used in conjunction with the present invention.

The operation of the present invention will now be described with reference to the flow chart of FIG. 4.

Figure 4:
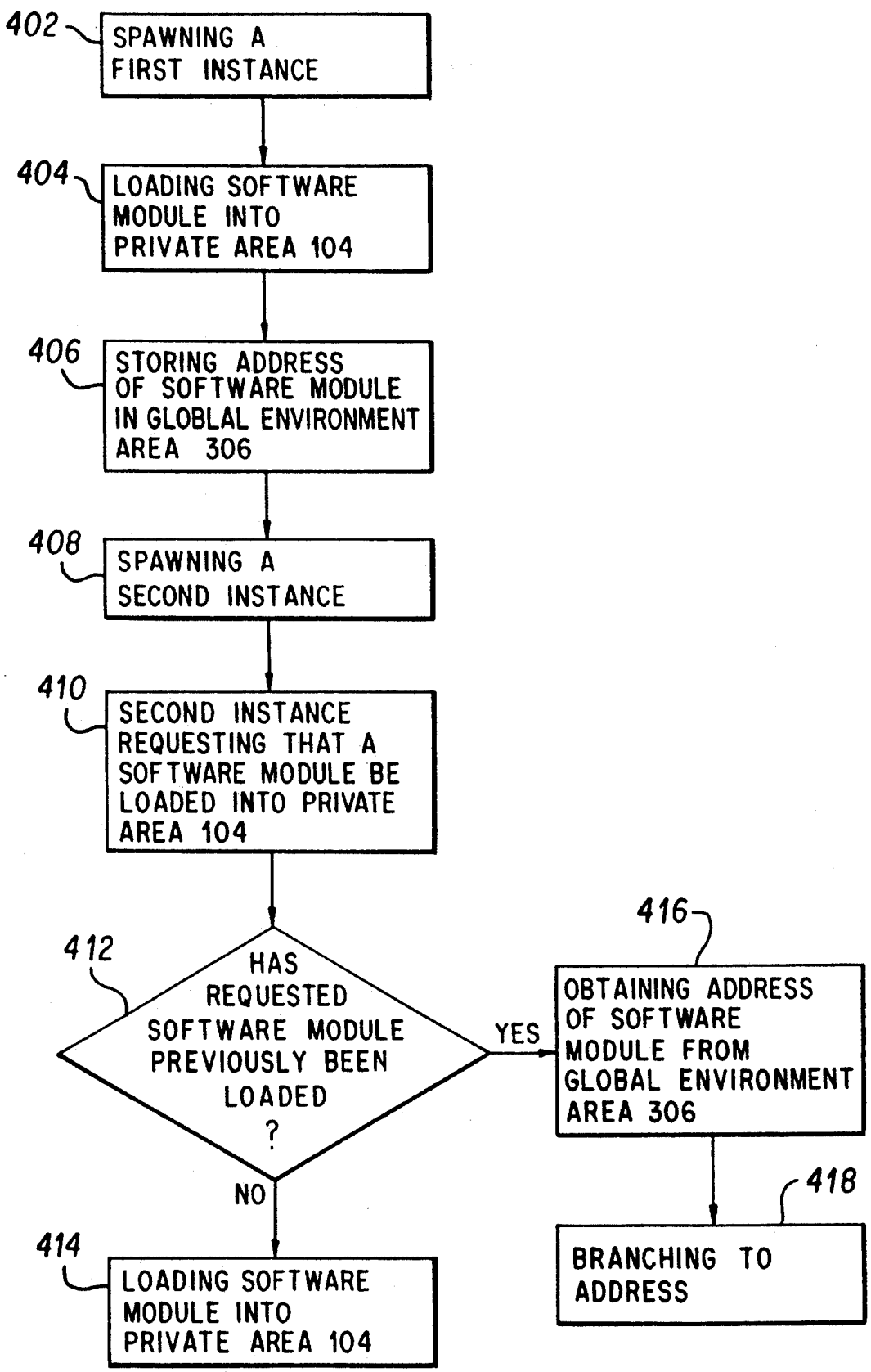
FIG. 4 is a flow diagram of the operation of the present invention.

Referring now to FIG. 4, the first step in the operation of the present invention entails spawning a first instance of a computer program, as indicated by block 402. The next step entails the loading of a software module of that computer program into the private area 104 of main memory 102 by the first instance, as indicated by block 404. Once loaded into the private area, the next step involves generating and storing an address (or addresses) of this software module into the global environment area 306, as indicated by block 406.

When the first instance has completed its turn of using the computer's facilities and the same computer program is executed, a second instance of the computer program is spawned, as shown by block 408. During its execution, the second instance may request the same software module that was loaded into the private area by the first instance, as indicated by block 410. If this occurs, the present invention pursues the step of establishing whether the requested software module has previously been loaded into the private area of memory, as indicated by decision block 412.

If the requested software module has not previously been loaded into the private area 104, then the next step involves loading the requested software module into the private area 104, as indicated by block 414. However, if the requested software module has been previously loaded, then the next step will be obtaining the address of the software module from the global environment area 306, as indicated by block 416. Subsequently, the next step involves branching to the address obtained from the global environment area 306, as indicated by block 418.

It should be understood that present invention is not limited to its preferred embodiments, and that the examples presented above are merely for the purposes of illustration. The scope of the present invention should therefore be interpreted by the following claims as defined by the forgoing figures and text.

What is claimed is:

1. A computer implemented process for memory management in a computer system having a storage device and a main memory, the main memory having a common area, a private area, and a global environment area, comprising:
   (1) spawning a first instance of a computer program, requiring at least one software module, and loading said software module from the storage device into the private area for execution;
   (2) generating a starting address of said software module, and storing said starting address in the global environment area;
   (3) spawning a second instance of said computer program which requires said software module, wherein said second instance requires said software module subsequent to said loading of said software module in step (1);
   (4) obtaining said starting address of said software module from said global environment area; and
   (5) branching to said starting address.

* * * * *